Feb. 13, 1951     E. B. WISENER ET AL     2,541,397
FISH LURE
Filed March 12, 1949
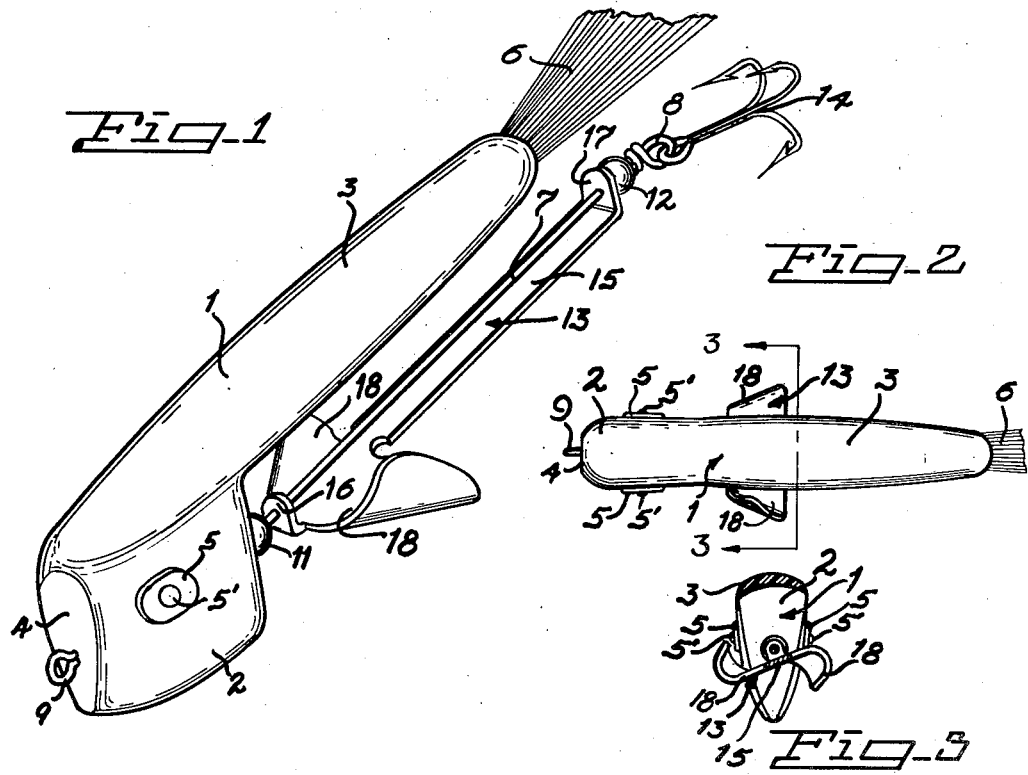
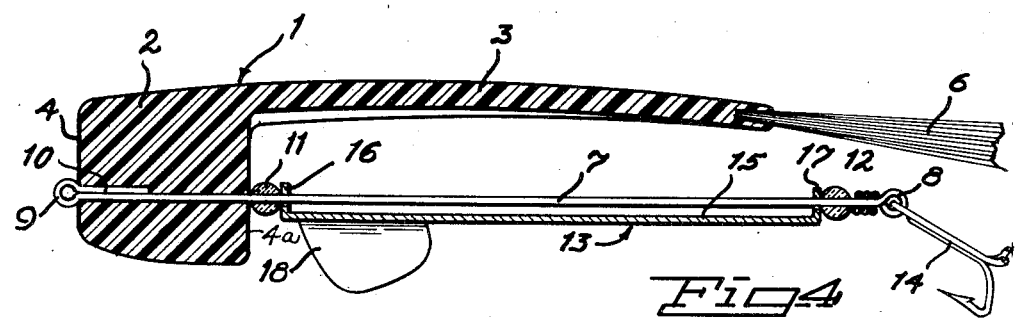
Everett B. Wisener
Robert F. Wisener
Inventor
By Glenn L. Fish
Attorney Patented Feb. 13, 1951

2,541,397

UNITED STATES PATENT OFFICE 2,541,397

FISH LURE

Everett B. Wisener and Robert F. Wisener,
Spokane, Wash.

Application March 12, 1949, Serial No. 81,142

1 Claim. (Cl. 43—42.19)

This invention relates to a fish lure and it is one object of the invention to provide a lure which will closely resemble a fish when drawn through water and have movements similar to those of a fish, thus causing fish which it is desired to catch to be readily attracted to the lure and to be caught.

Another object of the invention is to provide a lure having a body of novel formation including a head and a tongue projecting rearwardly from the head and under which a spinner is mounted for turning movement when the lure is drawn forwardly through water.

Another object of the invention is to provide the body with a head which is of a shape resembling that of a fish and is formed at opposite sides with protrusions imparting the appearance of eyes to the head of the lure.

Another object of the invention is to provide the lure with a spinner loosely mounted upon a rod extending rearwardly from the head and under the tongue of the body the rod having at its front end a loop or line receiving eye which serves to hold the rod against rearward displacement from the head.

Another object of the invention is to so form the spinner that while it may have turning movement about the rod transversely of the body its turning movements will be erratic and thus cause the shiny surfaces to reflect light in a flash-like manner and cause fish to be attracted to the lure.

Another object of the invention is to provide a spinner which is formed from a single blank of sheet metal and has side arms of an improved formation causing them each to constitute a propeller blade serving to impart turning movement to the spinner about the rod during forward movement of the lure through water.

With these and other objects the invention consists of a special construction and arrangement of parts illustrated in the accompanying drawings wherein:

Fig. 1 is a perspective view of the improved fish lure.

Fig. 2 is a top plan view of the lure, the view being upon a reduced scale.

Fig. 3 is a sectional view taken transversely through the lure upon the line 3—3 of Figure 2.

Fig. 4 is a sectional view taken longitudinally through the lure.

This improved lure has a body 1 which may be formed of plastic or other suitable material and has a head 2 at its front end from which extends a tongue 3. The head 2 has its side faces converging downwardly so that the head is tapered and at its front end the head is formed with a flat front face 4 tapered towards its lower end and with a flat rear face 4a. The side faces of the head are each formed with an outstanding boss 5 having a circle 5' at its center and representing eyes of a fish. Therefore the head of the lure will have a very natural appearance. The tongue 3 which extends rearwardly from the head has its upper face flush with the upper face of the head and referring to Figure 3 it will be seen that the tongue is of transversely arcuate concave-convexed formation with its concaved face presented downwardly. The tongue is also curved longitudinally slightly, as shown in Figure 4, and at its rear end the tongue carries a tail 6 which may be of the buck-tail type or formed of feathers or other suitable material.

A rod 7 extends longitudinally of the body under the tail in downwardly spaced relation thereto and at its rear end the rod or stiff wire is bent to form a loop or eye 8. The forward end portion of the rod is passed longitudinally through the head and its front end is bent back upon itself to form a loop or eye 9 disposed in front of the head and to which its line or leader is to be tied. Since the front end of the rod or wire is bent back upon itself to form the front eye or loop 9 there has been provided a portion 10 of double thickness which prevents the rod from turning in the head and enlarging the opening through which it passes and as the eye is disposed forwardly of the head it will prevent the rod from slipping rearwardly out of the head. Beads 11 and 12 which serve as thrust bearing for a spinner 13 are loosely mounted upon the rod with the front bead disposed close against the rear face of the head and the rear bead bearing against the rear end 8 which holds this bead in place upon the rod and also serves as a carrier for the hook 14.

The spinner 13 is formed from shiny sheet metal and consists of an elongated strip 15 which is of an even width throughout the major portion of its length from its rear end and has front and rear ends bent to form ears 16 and 17 which are perforated to loosely receive the rod and mount the spinner in offset relation to the rod and permit the spinner to turn about the rod. The strip is of appreciably greater width than thickness, as shown in Figure 1, and its forward portion is formed with side extensions or arms 18 which have their outer end portions curled diagonally of the arms and thus form the arms into propeller blades for the spinner. These propeller blades have their curled portions bent in opposite directions, the curled portion of one blade extending upwardly while the curled portion of the other blade extends downwardly, and the pitch or incline of the said curled portions is such that when the lure is drawn forwardly through water the blades will impart turning movement to the spinner about the rod. In view of its formation the spinner is in transversely offset relation to the rod and when the strip or main portion of the spinner is moving upwardly at one side of the rod it will not travel as rapidly as it does while moving downwardly at the opposite side of the rod. Therefore the spinner will have turning movements about the rod at varying speeds and the movement of the spinner will be erratic. During certain portions of its turning movement the flat strip of the spinner will reflect a greater amount of light than at other times and this variation of reflected light will cause the lure to resemble an injured fish which is so turning that its white belly causes spasmodic light reflections and this will cause fish which it is desired to catch to be attracted to the lure which they will attempt to take and be caught by the hook 14.

Having thus described the invention, what is claimed is:

A fish lure comprising a body having a head at its front end and a tongue integral with the upper portion of the head and extending rearwardly therefrom for its full width, said head having a wide transversely arcuate upper surface and side faces converging downwardly and intersecting along the lower edge of the head, the said head having a flat rear face and at its front end having a flat face merging into the upper surface and the side faces and lower edge of the head, said tongue having its upper and lower surfaces transversely arcuate and its upper surface merging into the arcuate upper surface of the head, the space under the tongue being unconfined for the full width of the head and the full length of the tongue, a rod of stiff wire extending longitudinally of the body in spaced relation below said tongue and midway the width of the tongue and the head, said rod being free from said tongue and having its forward portion passing longitudinally through the head and formed at its front end with a line-engaging eye projecting forwardly from the front face of the head, said rod extending rearwardly beyond the rear end of the tongue and formed with an eye at its rear end, a hook carried by the rear eye, and a spinner consisting of an elongated flat metal strip normally disposed under the rod in parallel spaced relation to the rod and having its rear end bent upwardly and to form a rear ear having an opening through which the rod loosely passes, the spinner being widened at the front end of said strip and forming a propeller projecting from opposite sides of the front end of the strip and bent to form blades disposed diagonally at an incline towards the front end of the propeller, and an ear at the front end of said propeller disposed parallel to the rear ear and formed with an opening through which the rod loosely passes, said ears loosely mounting the spinner for turning movement about the rod and the blades serving to impart such movement to the spinner when the lure is drawn forwardly through water.

EVERETT B. WISENER.
ROBERT F. WISENER.

REFERENCES CITED

The following references are of record in the file of this patent:

UNITED STATES PATENTS

| Number | Name | Date |
|---|---|---|
| 839,917 | Chapman | Jan. 1, 1907 |
| 974,493 | Immell | Nov. 1, 1910 |
| 1,393,790 | Kenney | Oct. 18, 1921 |
| 1,395,533 | Tuttle | Nov. 1, 1921 |
| 1,785,310 | Johnson | Dec. 16, 1930 |

FOREIGN PATENTS

| Number | Country | Date |
|---|---|---|
| 507,788 | France | July 5, 1922 |
| 883,212 | France | Mar. 22, 1943 |